(12) United States Patent
Sadahiro et al.

(10) Patent No.: US 11,443,005 B2
(45) Date of Patent: Sep. 13, 2022

(54) UNSUPERVISED CLUSTERING OF BROWSER HISTORY USING WEB NAVIGATIONAL ACTIVITIES

(71) Applicant: Microsoft Technology Licensing, LLC, Redmond, WA (US)

(72) Inventors: Ken M. Sadahiro, Redmond, WA (US); Aaron M. Butcher, Redmond, WA (US); Philippe Favre, Redmond, WA (US); Anatolie Gavriliuc, Kirkland, WA (US); Kofi S. Opoku, Seattle, WA (US); Seung-Yup Chai, Redmond, WA (US); Nandini Arijit Bhattacharya, Bellevue, WA (US); John D. Malatras, Seattle, WA (US); Nicolas A. Champagne-Williamson, Kirkland, WA (US); Kangsan Lee, Woodinville, WA (US); Jerin R. Schneider, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 371 days.

(21) Appl. No.: 16/428,755

(22) Filed: May 31, 2019

(65) Prior Publication Data
US 2020/0380051 A1   Dec. 3, 2020

(51) Int. Cl.
*G06F 16/906* (2019.01)
*G06F 16/9535* (2019.01)
(Continued)

(52) U.S. Cl.
CPC .......... *G06F 16/954* (2019.01); *G06F 16/906* (2019.01); *G06F 16/9535* (2019.01); *G06F 16/9537* (2019.01); *H04L 67/535* (2022.05)

(58) Field of Classification Search
CPC . G06F 16/906; G06F 16/9535; G06F 16/9537
See application file for complete search history.

(56) References Cited

U.S. PATENT DOCUMENTS

| 2006/0271533 A1* | 11/2006 | Sakurai | ................... G06F 16/35 |
| 2008/0010292 A1* | 1/2008 | Poola | .................... G06F 16/986 |

(Continued)

OTHER PUBLICATIONS

Adar, et al., "Large Scale Analysis of Web Revisitation Patterns", In Proceedings of the SIGCHI Conference on Human Factors in Computing Systems, Apr. 5, 2008, pp. 1197-1206.
"International Search Report & Written Opinion issued in PCT Application No. PCT/US20/029418", dated Jun. 12, 2020, 11 Pages.
Seo, et al., "Generalized Link Suggestions via Web Site Clustering", In Proceedings of the 20th International Conference on World Wide Web, Mar. 28, 2011, pp. 77-86.

(Continued)

*Primary Examiner* — James Trujillo
*Assistant Examiner* — Michal Bogacki
(74) *Attorney, Agent, or Firm* — Fiala & Weaver P.L.L.C.

(57) ABSTRACT

Methods, systems, and computer program products are described herein for unsupervised clustering of browser history using web navigational activities. For example, correlation scores are calculated that indicate correlations between web pages indicated in a browsing history of a user. Moreover, the correlation scores are calculated based on web navigational activities determined from the browsing history. In addition, the web pages are clustered into a plurality of clusters based on the correlation scores and the clusters are ranked for relevancy to the user based on a relevancy algorithm. The relevancy algorithm determines a likelihood that a user will access a corresponding web page for each web page of a cluster. A cluster having a greatest ranking is identified and an indication of a web page of the identified cluster as a suggested web page to revisit is provided to a user.

20 Claims, 6 Drawing Sheets

(51) Int. Cl.
*G06F 16/9537* (2019.01)
*G06F 16/954* (2019.01)
*H04L 67/50* (2022.01)

(56) References Cited

U.S. PATENT DOCUMENTS

| | | | |
|---|---|---|---|
| 2009/0216708 A1* | 8/2009 | Madaan | G06F 16/355 |
| 2009/0327913 A1 | 12/2009 | Adar et al. | |
| 2011/0173197 A1* | 7/2011 | Mehta | G06F 16/951 |
| | | | 707/737 |
| 2012/0271805 A1* | 10/2012 | Holenstein | G06F 16/955 |
| | | | 707/706 |
| 2012/0284597 A1* | 11/2012 | Burkard | G06F 16/9574 |
| | | | 715/205 |
| 2013/0006897 A1* | 1/2013 | Jain | G06F 16/9574 |
| | | | 706/12 |
| 2013/0138655 A1* | 5/2013 | Yan | G06F 16/337 |
| | | | 707/738 |
| 2016/0283678 A1* | 9/2016 | Ram | G09B 19/00 |
| 2017/0031931 A1* | 2/2017 | Linda | G06F 16/909 |
| 2017/0242898 A1* | 8/2017 | Su | G06F 16/90324 |
| 2018/0139296 A1* | 5/2018 | Yeh | H04L 61/30 |
| 2020/0042567 A1* | 2/2020 | Birch | G06F 16/954 |

OTHER PUBLICATIONS

Yang, et al., "Personalizing Web Page Recommendation via Collaborative Filtering and Topic-Aware Markov Mode", In Proceedings of IEEE International Conference on Data Mining, Dec. 13, 2010, pp. 1145-1150.

Zaiane, et al., "Mission-Based Navigational Behaviour Modeling for Web Recommender Systems", In Proceedings of 6th International Workshop on Knowledge Discovery on the Web, Aug. 22, 2004, pp. 37-55.

Dumais, et al., "Stuff I've Seen: A System for Personal Information Retrieval and Re-Use", In Proceedings of ACM SIGIR Forum Archive vol. 49, Issue 2, Dec. 2015, pp. 28-35.

Lee, et al., "Time, topic and trawl: stories about how we reach our past", In Proceedings of the Designing Interactive Systems Conference, Jun. 11, 2012, pp. 234-243.

Tauscher, et al., "Revisitation patterns in World Wide Web navigation", In Proceedings of the ACM SIGCHI Conference on Human Factors in Computing Systems, Mar. 22, 1997, pp. 309-406.

Zamir, et al., "Web Document Clustering: A Feasibility Demonstration", In Proceedings of the 21st Annual International ACM SIGIR Conference on Research and Development in Information Retrieval, Aug. 24, 1998, pp. 46-54.

* cited by examiner

Provide, to the user the ranked clusters arranged according to the ranking ⟩702

↓

Enable the user to select a web page of the ranked clusters to revisit ⟩704

UNSUPERVISED CLUSTERING OF BROWSER HISTORY USING WEB NAVIGATIONAL ACTIVITIES

BACKGROUND

Web navigation refers to the process of navigating a network of information resources (e.g., web pages, images, videos, etc.) in the World Wide Web (also commonly referred to as "the Web"). A user typically navigates the Web using links and views web pages through a web browser installed on a user computing device. For instance, a user may input a link to a web page (e.g., a Uniform Resource Locator (URL)) into a web browser of a user computing device. The web browser of the user computing device retrieves the web page from a remote web server (e.g., using Hypertext Transfer Protocol (HTTP)) and displays the web page on the user computing device.

Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user computing device.

Many web browsers employ some mechanism for recording web browsing history. Web browsing history is typically a chronological list of web pages previously visited through a web browser and may include associated data such as web page title, link to the webpage, and time of visit. This allows users to recall previously visited web pages without relying on human memory. Additionally, some browsers enable users to keep references to web pages by "bookmarking" the web pages, which provides for quick access to the web page in the future.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for unsupervised clustering of browser history using web navigational activities, where the web navigational activities refer to a process a user performs in navigating information resources in the World Wide Web and to contextual information related to this process. For example, correlation scores are calculated that indicate correlations between web pages indicated in a browsing history of a user. The correlation scores are calculated based on web navigational activities determined from the browsing history. The web pages are clustered into a plurality of clusters based on the correlation scores and the clusters are ranked for relevancy to the user based on a relevancy algorithm. The relevancy algorithm determines a likelihood that a user will access a corresponding web page for each web page of a cluster. A cluster having a greatest ranking is identified and an indication of a web page of the identified cluster as a suggested web page to revisit is provided to a user.

In an embodiment, a web activity graph is generated, indicating the web pages as nodes and the correlation scores as edges between corresponding web page pairs and the web pages are organized into the clusters based on the nodes and edges of the web activity graph.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Web navigation refers to the process of navigating a network of information resources (e.g., web pages, images, videos, etc.) in the World Wide Web (also commonly referred to as "the Web"). A user typically navigates the Web using links and views web pages through a web browser installed on a user computing device. For instance, a user inputs a link to a web page (e.g., a Uniform Resource Locator (URL)) into a web browser of a user computing device. The web browser of the user computing device retrieves the web page from a remote web server (e.g., using Hypertext Transfer Protocol (HTTP)) and displays the web page on the user computing device.

Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user computing device. Some examples of web browsers include Internet Explorer® and Microsoft Edge®, both developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif.

Many web browsers employ some mechanism for recording web browsing history. Web browsing history is typically a chronological list of web pages previously visited through a web browser and may include associated data such as web page title, link to the webpage, and time of visit. This allows users to recall previously visited web pages without relying on human memory. Additionally, some browsers enable users to keep references to web pages by "bookmarking" the web pages, which provide for quick access to the web page in the future.

Existing browsing-history tools have limited usefulness in helping users to re-find previously visited information resources on the Web. For example, a browser web history can be overinclusive by including all previously visited web pages of user. Say a user is looking for a web page she visited while planning a trip. The user will have to sift through the list of web pages and may only be able to narrow her search if she remembers approximately the time frame of her visit to the web page. As another example of the limitations of existing browsing-history tools, bookmarking requires a user to have foresight of the utility of a web page at the time of visiting the web page in order to bookmark the web page. Moreover, bookmarks may become cluttered and lose their effectiveness in providing quick access to web pages if references to too many web pages are saved.

Figure 1:
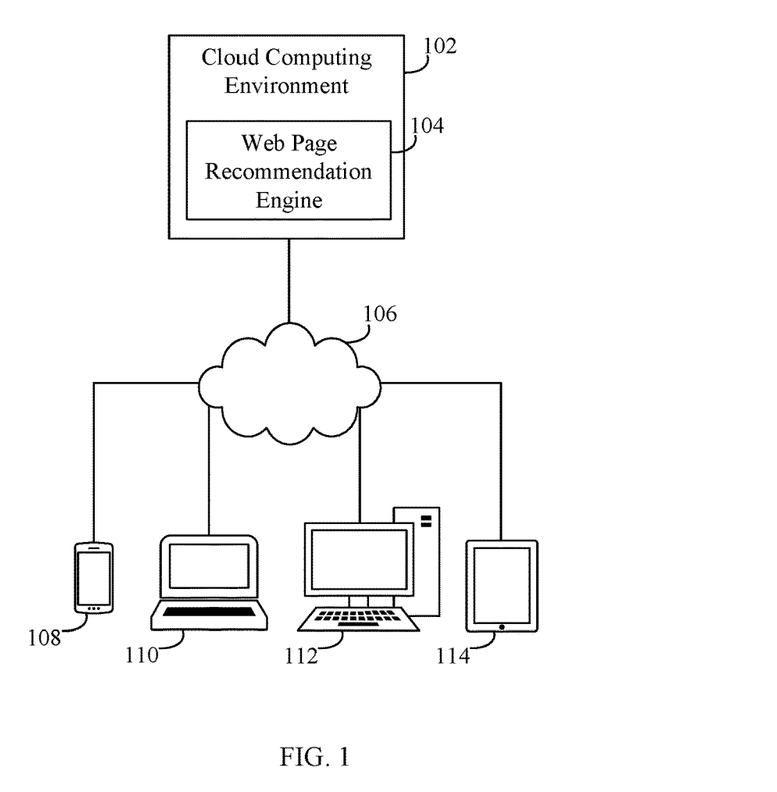
FIG. 1 depicts a block diagram of an example system for suggesting a web page for a user to revisit based on web navigational activities, according to an example embodiment.

Embodiments described herein bestow improvements to tools for searching browsing histories for pages of interest. To help illustrate, FIG. 1 will now be described. FIG. 1 depicts a block diagram of an example system 100 for suggesting a web page for a user to revisit based on web navigational activities, according to an embodiment. Web navigational activities as described herein refers to a process a user performs in navigating information resources in the World Wide Web as well as the contextual information related to this process. In an embodiment, web navigational activities may include activities performed by a user while the user browses the Web using a browser of a computing device. For example, the web navigational activities can include: an amount of time the user spends at a web page; a navigational trait of how a web page is visited (e.g., by clicking a link, finding in a search results, etc.); and temporal information (e.g., visiting two web pages close in time) or navigational information that associate a first web page with a second web page (e.g., traversing between web pages in a browser).

As depicted in FIG. 1, system 100 includes a plurality of different computing devices, such as a smart phone 108, a laptop 110, a desktop 112, and a tablet 114. In an embodiment, a user may be associated with each of these computing devices by interacting with each one. The user may interact with each of the computing devices in different contexts and use them for carrying out different tasks. For example, the user may use desktop 112 strictly for work related tasks because desktop 112 is work-issued. In contrast, the other computing devices may be used mostly for recreational tasks (e.g., planning a trip or selecting a restaurant for dining). As another example, the portability of smart phone 108 lends it to being used in most locations and even while the user is moving (e.g., walking, riding in a vehicle, etc.).

More specifically, smart phone 108, laptop 110, desktop 112, and tablet 114 may each include one or more web browsers that enable the user to interact with web applications and/or web pages via a network 106. For example, the user may input a link into a browser of smart phone 108, and the browser of smart phone 108 may retrieve the web page and display the web page on smart phone 108.

Although the computing devices in FIG. 1 are pictured as a smart phone, a laptop, a desktop, and a tablet, any number of computing devices may be present for a particular user, and the computing devices may each be any type of mobile or stationary computing device, or other browser-enabled device. Example mobile computing devices include but are not limited to a Microsoft® Surface® device, a personal digital assistant (PDA), a thin client, a laptop computer, a notebook computer, a tablet computer such as an Apple iPad™, a netbook, a mobile phone, a portable gaming device, or a wearable computing device. Example stationary computing devices include but are not limited to a desktop computer or PC (personal computer), a gaming console, or a server.

As further shown in FIG. 1, a cloud computing environment 102 includes a web page recommendation engine 104. In an embodiment, web page recommendation engine 104 may be a cloud service running in one or more resources in cloud computing environment 102. For example, the one or more resources may be one or more servers and form a network-accessible server set that are each accessible by a network such as the Internet (e.g., in a "cloud-based" embodiment) to store, manage, and process data. Additionally, environment 102 may include any type and number of other resources including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of a multi-tenant cloud, etc.), and/or further types of resources.

As portrayed in FIG. 1, web page recommendation engine 104 is communicatively coupled via network 106 to smart phone 108, laptop 110, desktop 112, and tablet 114. Network 106 may comprise one or more networks such as local area networks (LANs), wide area networks (WANs), enterprise networks, the Internet, etc., and may include one or more of wired and/or wireless portions. Smart phone 108, laptop 110, desktop 112, and tablet 114 may include at least one network interface that enables communications over network 106. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Web page recommendation engine 104 is configured to collect web navigational activities from the computing devices used by the user. For example, web page recommendation engine 104 may receive and aggregate web navigational activities from each of smart phone 108, laptop 110, desktop 112, and tablet 114. In an embodiment, the web navigational activities may be stored locally on the computing devices in the web browser history of one or more browsers running on the computing devices. Web page recommendation engine 104 may respectively request browsing history from one or more of smart phone 108, laptop 110, desktop 112, and tablet 114. Alternatively, one or more of smart phone 108, laptop 110, desktop 112, and tablet 114 may be configured to periodically transmit browsing history to web page recommendation engine 104.

Web page recommendation engine 104 is further configured to analyze received browsing history including web navigational activities (described in more detail herein with reference to FIGS. 3 and 4) and provide an indication to a user of a web page as a suggested web page to revisit based on the collected web navigational activities. In an embodiment, web page recommendation engine 104 may provide the indication to each of smart phone 108, laptop 110, desktop 112, and tablet 114 for display. In another embodiment, web page recommendation engine 104 may selectively provide the indication to the computing devices. For instance, web page recommendation engine 104 may provide work-issued computing devices with only indications of web pages relevant to the work of the user. In still yet another embodiment, smart phone 108, laptop 110, desktop 112, and tablet 114 may request browsing history from each other and analyze the browsing history locally to identify a web page to revisit.

As such, web page recommendation engine 104 may be implemented in various ways. In some embodiments, web page recommendation engine 104 may have both client-side and server-side components. In other embodiments, web page recommendation engine 104 may run locally on a computing device that includes a browser.

Figure 2:
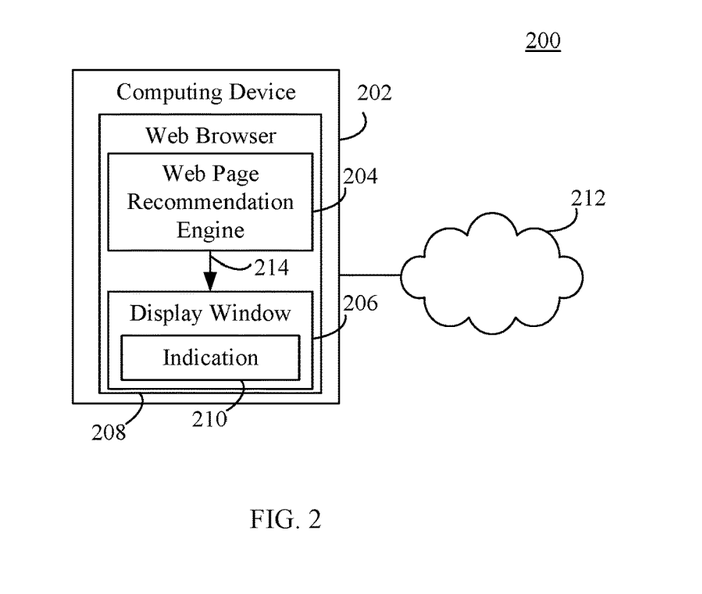
FIG. 2 depicts a block diagram of computing device, coupled to a network, that includes a web page recommendation engine, according to an example embodiment.

To help illustrate, FIG. 2 is now described. FIG. 2 depicts a block diagram of an example system 200 for suggesting a web page indicated in a browsing history of a user for the user to revisit based on web navigational activities determined from the browsing history of a computing device. As shown in FIG. 2, system 200 includes a client computing device 202. Client computing device is an example implementation of one of smart phone 108, laptop 110, desktop 112, and tablet 114 in FIG. 1, or of another computing device of the user. As further shown in FIG. 2, client computing device 202 comprises a web browser 208 including a web page recommendation engine 204 and a display window 206. For illustrations purposes, web browser 206 is shown to include web page recommendation engine 204 (e.g., as a portion of the browser code, as a browser extension, a browser plug-in, etc.). However, in other embodiments, web page recommendation engine 204 may be separate from web browser 208.

Web browser 208 is configured to enable a user of computing device 202 to interact with web applications and/or web pages via a network 212. Network 212 is an example of network 106 of FIG. 1. The user may input a link to a web page into web browser 208. Browser 208 may retrieve the web page over network 212 based on the link and display the retrieved web page on display window 206.

Web page recommendation engine 204 is configured to collect web navigational activities that are accumulated by the user browsing the Internet using a browser of a computing device. Web page recommendation engine 204 may detect and record locally on client computing device 202 web navigational activities performed by a user while browsing the Internet using web browser 208 via network 212. For example, in association with an identifier for the user (e.g., a login name, an email address, etc.), web page recommendation engine 204 may record addresses/links to pages the user visited using browser 208, a time of each page visit, a particular tab of browser 208 in which a page is visited, how a page was selected (e.g., right or left clicking on a displayed link, typing in a link into the browser address bar, etc.), etc. Based on this collected information, web page recommendation engine 204 is enabled to determine relationships between visited web pages, such as detecting that the user switching between tabs displaying different web pages in web browser 208, which may indicate a correlation between the two web pages. In this example, web page recommendation engine 204 may store this detected activity in the browsing history of web browser 208 in an entry linked to either of the two web pages. In another scenario, web page recommendation engine 204 may detect that two web pages are opened simultaneous on display window 206 but does not detect the user traversing between the pages. Though this web navigational activity may indicate there is little or no relationship between the open web pages, recommendation engine 204 may or may not record this web navigational activity in the web browsing history.

Web page recommendation engine 104 is further configured to provide, to the user of computing device 202, an indication of a web page as a suggested web page to revisit. For example, based on web navigational activities stored in the browsing history of web browser 208, which may include web browsing history information for the user from multiple web browsers at one or more computing devices, web page recommendation engine 204 may suggest a web page indicated in the browser history for the user to revisit, indicated in FIG. 2 as suggested page 214. For example, web page recommendation engine 204 may provide suggested page 214 for display on display window 208 of computing device 202. The indication may include a link (e.g., a URL) to the web page, title of the web page, and/or a thumbnail of the webpage.

Figure 3:
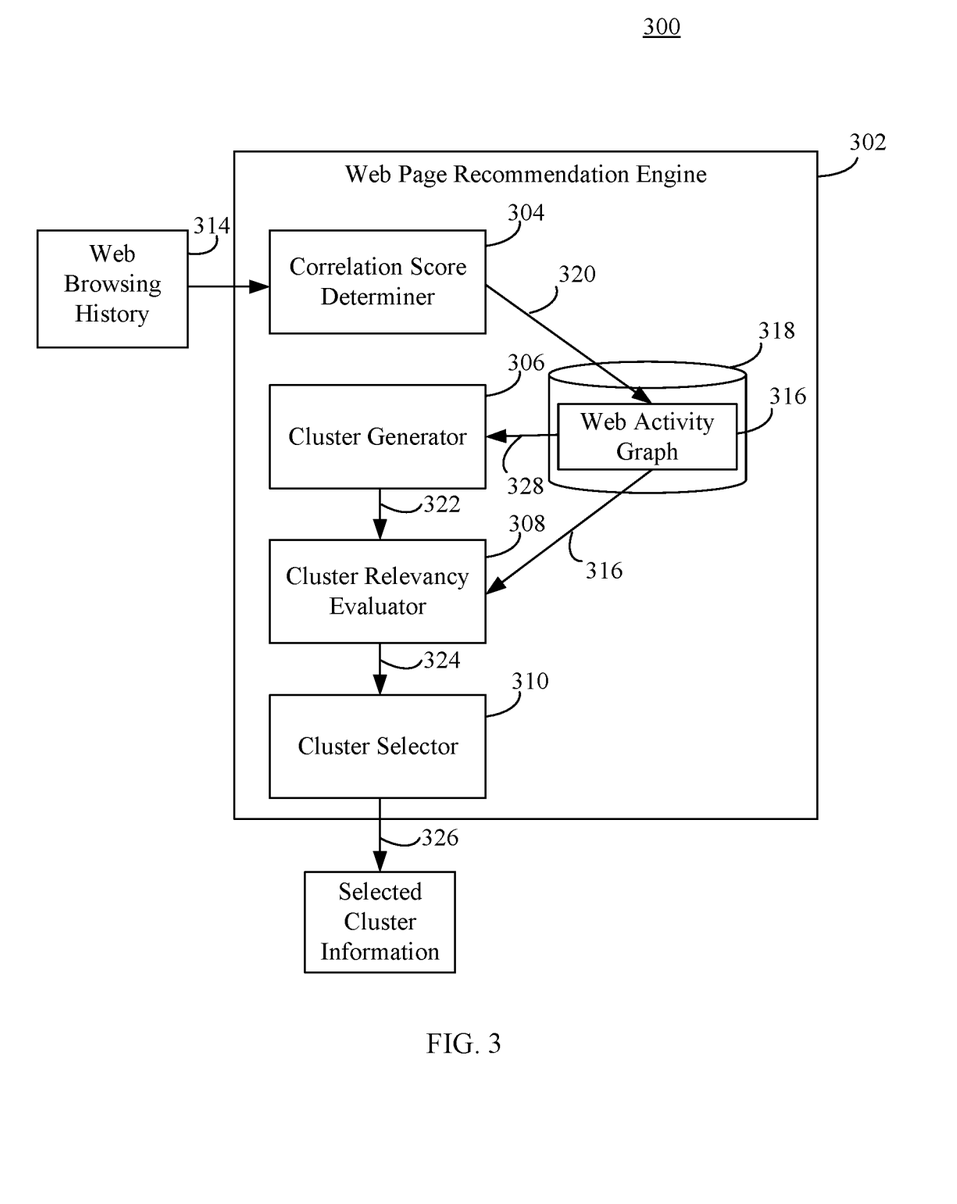
FIG. 3 shows a block diagram of a web page recommendation engine, according to an example embodiment.

Web page recommendation engine 104 (FIG. 1) and web page recommendation engine 204 (FIG. 2) may be configured to perform their functions in various ways. For example, FIG. 3 depicts a block diagram of an example system 300 for clustering web pages of a web browsing history based on web navigational activities and identifying a cluster of web pages relevant to a user. As shown in FIG. 3, system 300 includes a web page recommendation engine 302. Web page recommendation engine 302 is an example embodiment of web page recommendation engine 104 in FIG. 1 and web page recommendation engine 204 in FIG. 2. As further shown in FIG. 3, web page recommendation engine 302 includes a correlation score determiner 304, a cluster generator 306, a cluster relevancy evaluator 308, and a cluster selector 310.

Correlation score determiner 304 is configured to calculate correlation scores that indicate correlations between web pages indicated in the browsing history associated with a user. For example, correlation score determiner 304 may receive web browsing history 314 (e.g., from smart phone 108, laptop 110, desktop 112, and/or tablet 114 in FIG. 1) and calculate correlation scores between any two web pages in browsing history 314. The correlation scores may be calculated based on web navigational activities retained in web browsing history 314. As shown in FIG. 3, correlation score determiner 304 generates correlation scores 320, which indicates the web pages identified in the browsing history and a correlation score for each pair of web pages, and stores correlation scores 320 in a data store 318 as part of a web activity graph 316. Data store 318 may include one or more of any type of suitable storage medium, such as a hard disk, solid-state drive, magnetic disk, optical disk, read-only memory (ROM), or random-access memory (RAM).

For instance, to determine correlation scores, different types of web navigational activities may be assigned different coefficients. Some web navigational activities may indicate stronger correlations between web pages in browsing history 314 than other web navigational activities. For example, a user right clicking on a link to another web page included in a displayed web page in a browser to open the other web page in a new tab of the browser indicates a stronger correlation between the web pages than the user just left clicking on the link and replacing the displayed web page with a new web page associated with the link. As another example, a user switching more than once between tabs displaying web pages in a browser indicates a stronger relationship between the web pages displayed in the tabs than the user switching between the tabs only once. Thus, certain web navigational activities may be assigned coefficients reflecting stronger correlations between web pages than other web navigational activities. If more than one web navigational activity exists between a web page pair, then the corresponding coefficients for each web navigational activity can be combined (e.g., additively, multiplicatively, etc.) to produce a single, increased correlation score for any web page pair.

Correlation scores may also be determined based on a similarity of content between two web pages. For example, different coefficients values may be assigned for different types of similarity between web pages, such as two web pages belonging to a same domain, similarity of title between two web pages (determined using a similarity algorithm, for example, Jaccard Similarity algorithm), and similarity of content between two web pages (e.g., determined using latent semantic analysis, determined using a machine learning algorithm, for example, a self-organizing map, etc.). If more than one content similarity exists between a web page pair, then the corresponding coefficients for each content similarity can be combined (e.g., additively, multiplicatively, etc.). Additionally, if a web page pair has a correlation score with a web navigational activity component and a content similarity component, they can be combined (e.g., additively, multiplicatively, etc.) so that there is a single correlation score for any web page pair. Multipliers may also be combined with the web navigational activity component and the content similarity component, and various attributes may be weighted differently (or the same), when calculating a correlation score so that components can be given greater or lesser weight in the calculation.

Cluster generator 306 is configured to cluster the web pages into a plurality of clusters based on correlation scores 320 generated by correlation score determiner 304. For example, cluster generator 306 may retrieve correlation scores 328 from web activity graph 316 in data store 318. Correlation scores 328 may include correlation scores for all or a subset of unique pairs of web pages in web browsing history 314. Each web page may be considered a node. Each correlation score between a pair of web pages may correspond to an edge between the two web pages. Based on this node/edge configuration, cluster generator 306 may cluster the web pages based on the correlation scores. Web pages in web browsing history 314 may be clustered using any known clustering algorithm, for example, hierarchical clustering, centroid-based clustering, distribution-based clustering, and density-based clustering. Cluster generator 306 may represent the web pages and correlations scores as nodes and edges in web activity graph 316, to represent the correlations between web pages of web browsing history 314. Web activity graph 316 may be stored in data store 318 in any form, such as in the form of a table, array, or otherwise. Alternatively, web activity graph 316 may be stored remotely from web page recommendation engine 302.

Cluster relevancy evaluator 308 is configured to rank the clusters for relevancy to the user. For example, cluster relevancy evaluator 308 may receive a cluster list 322 indicating the determined plurality of clusters from cluster generator 306. Alternatively, or in addition to, cluster relevancy evaluator 308 may access web activity graph 316 for information related to the plurality of clusters, including indications of the clusters determined by cluster generator 306, indications of the web pages grouped in each cluster, indications of the correlations scores associated with web page pairs, indications of any clustering scores, centroids, and/or other generated clustering information associated with the determined clusters, etc. In an embodiment, using web activity graph 316, cluster relevancy evaluator 308 may rank the clusters for relevancy to a user based on a relevancy algorithm. For example, the relevancy algorithm may determine a likelihood that a user will access particular web pages of a cluster. Cluster relevancy evaluator 308 may use a machine learning model trained on other users' browsing history to assign the likelihoods to web pages. Cluster relevancy evaluator 308 is also configured to calculate a relevancy score for each of the clusters based on the determined likelihoods. For example, the likelihoods associated with each web page in a cluster may be aggregated to indicate an overall relevancy score for a cluster. Cluster relevancy evaluator 308 may use the likelihood values associated with web pages in a cluster to filter out web pages in the cluster (e.g., web pages below a threshold) and rank the web pages within the cluster.

Another example embodiment of a relevancy algorithm is described as follows. The relevancy algorithm may be configured to take into account any combination of the following factors:

Recency—the recency factor corresponds to how recent (e.g., how many minutes ago, hours ago, days ago, etc.) the user visited a particular web page. The more recently the user visited the web page, the greater the value of the recency factor. The longer ago the user visited the web page, the lower the value of the recency factor. For instance, if the user visited the web page today, the recency factor value may be a "1.00" (highest value on a 1.00 to 0.00 scale), while if the web page was visited 14 days ago or greater, the recency factor value may be a "0.00" (lowest value).

Bookmarked—the bookmarked factor corresponds to whether the user bookmarked a particular web page. If the user bookmarked the web page, the greater the bookmarked factor value (e.g., "1.00"), while if the user did not bookmark the web page, the lower the bookmarked factor value (e.g., "0.00").

Currency—the currency factor corresponds to how often the user has visited a particular web page at the current time of day (a timespan when the relevancy algorithm is being executed). If the user has often visited the web page at the current time of day, the greater the value of the currency factor. If the user has infrequently visited the web page at the current time of day, the lower the value of the currency factor. For instance, if all visits to the web page occurred within a current time window (e.g., last 3 hours), the currency factor value may be a "1.00" (highest value). If the user made no visits to the web page in the current window, the currency factor value may be a "0.00" (lowest value).

Category—the category factor corresponds to whether a particular web page is in a same category (e.g., sports, particular sports such as football, news, entertainment, social media, etc.) as the web page the user was just looking at. If so, the category factor value may be a "1.00" (highest value). If not, the currency factor value may be a "0.00" (lowest value).

Total visits—the total visits factor corresponds to a number of visits made to a particular web page in the last time period (e.g., 14 days). To determine this factor for a particular page, the number of visits to that page may be divided by a total number of page visits by the user during that time period.

In an embodiment of the relevancy algorithm, each included factor may be multiplied by a coefficient so a score in a desired range may be generated (e.g., 0.00 to 1.00) for each page of the clusters. Web pages may be culled out that have a 0 score. The scores for the pages in a cluster may be summed or otherwise combined to determine a score for each cluster. The scores for the clusters may be compared to rank the clusters and thereby determine a highest ranked cluster. All scores may be maintained to provide to the user any combination of the clusters (e.g., the highest three ranked clusters), and/or the any combination of the web pages (e.g., the highest two ranked pages).

Note that each cluster may be identified in any manner, including by a numerical value, an alphamerical value, a title, etc. A title for a cluster may be determined in any manner, including by performing a semantic analysis of the web pages included in the cluster to determine a context of the pages, and using the determined context as the cluster title (e.g., London vacation, Seattle Mariners, etc.).

Cluster relevancy evaluator 308 is further configured to optionally filter the clusters based on a context of usage of the computing device by the user. For example, cluster relevancy evaluator 308 may filter clusters based on the type of computing device, the time of day, the day of the week or month, and/or the location of the computing device. To help illustrate, cluster relevancy evaluator 308 may filter out clusters including web pages not related to work of a user when the user is at her workplace. As another example, based on a user's daily routine, cluster relevancy evaluator 308 may exclude clusters having low relevancy at certain times of a day.

Cluster selector 310 is configured to identify a cluster from the plurality of clusters and provide an indication of a cluster of web pages, and/or a particular web page of the identified cluster, to provide to a user as one or more suggested web pages to revisit. For example, cluster selector 310 may receive a cluster ranking 324 from cluster relevancy evaluator 308 and select clusters to provide to a user above a certain threshold. More specifically, cluster selector 310 may select only the highest ranked clusters (e.g., the top three) and provide indications to the user of one or more web pages from each of the highest ranked clusters (described with in more detail herein with reference to FIGS. 8 and 9). The selected one or more clusters and/or web pages are output by cluster selector 310 as selected cluster information 326.

Figure 4:
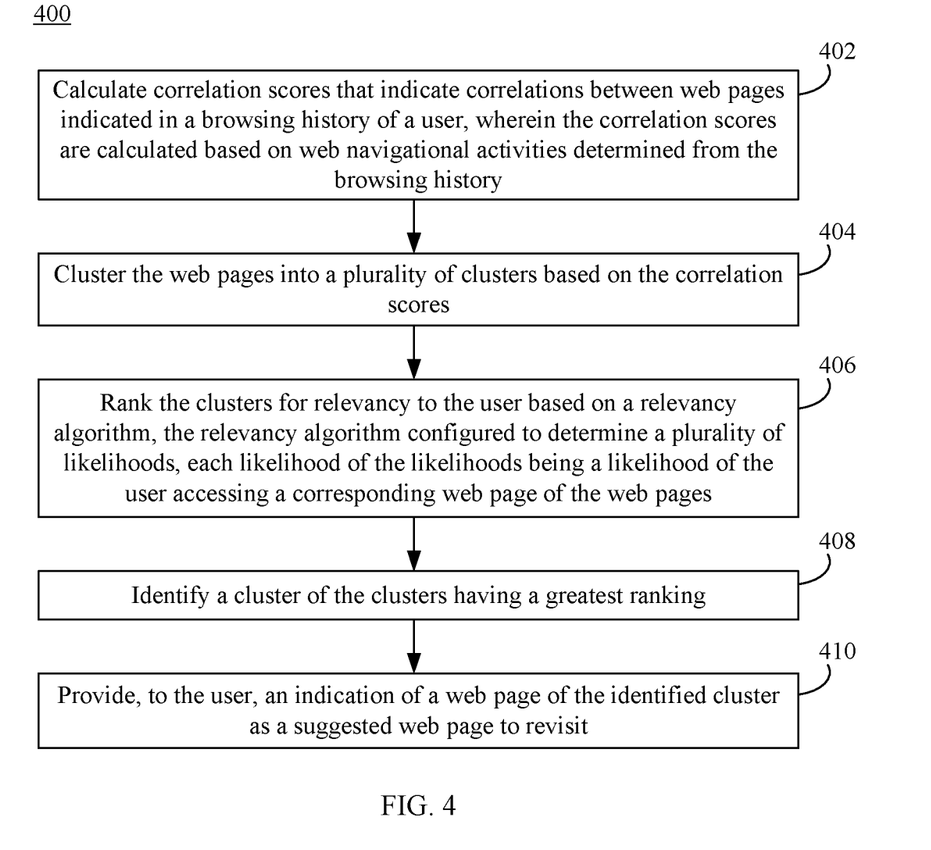
FIG. 4 depicts a flowchart of a method for clustering web pages of a web browsing history based on web navigational activities and identifying a cluster of web pages relevant to a user, according to an example embodiment.

To illustrate this further, FIG. 4 is described. FIG. 4 depicts a flowchart 400 of a method for clustering web pages from a web browsing history based on web navigational activities and identifying a cluster of web pages relevant to a user, according to an example embodiment. FIG. 4 is described with continued reference to FIG. 3. However, other structural and operational embodiments will be apparent to persons skilled in the relevant art(s) based on the following discussion regarding flowchart 400.

As shown in FIG. 4, the method of flowchart 400 begins at step 402. In step 402, correlation scores that indicate correlations between web pages indicated in a browsing history of a user are calculated based on web navigational activities determined from the browsing history. For example, and with continued reference to FIG. 3, correlation score determiner 304 may receive web browsing history 314 and calculate correlation scores 320 between any two web pages in browsing history 314. Correlation scores 320 may be calculated based on web navigational activities retained in web browsing history 314.

At step 404 in flowchart 400, the web pages are clustered into a plurality of clusters based on the correlation scores. For example, and with continued reference to FIG. 3, cluster generator 306 retrieves correlation scores 328 for all or a subset of unique pairs of web pages in web browsing history 314 and clusters the web pages based on correlation scores 328. Web pages in web browsing history 314 may be clustered using any known clustering algorithm, for example, hierarchical clustering, centroid-based clustering, distribution-based clustering, and density-based clustering. As shown in FIG. 3, cluster generator 306 generates cluster list 322, which indicates the determined one or more clusters of web pages.

At step 406 in flowchart 400, the clusters are ranked for relevancy to the user based on a relevancy algorithm, the relevancy algorithm configured to determine a plurality of likelihoods, each likelihood of the likelihoods being a likelihood of the user accessing a corresponding web page of the web pages. For example, and with continued reference to FIG. 3, cluster relevancy evaluator 308 receives cluster list 322, and may rank the clusters of cluster list 322 for relevancy to the user based on a relevancy algorithm. The relevancy algorithm may determine a likelihood that a user will access particular web pages in a cluster. Cluster relevancy evaluator 308 may use a machine learning model trained on other users' browsing history to assign the likelihoods to each web page in a cluster. Cluster relevancy evaluator 308 may also calculate a relevancy score for each of the clusters based on the determined likelihoods. For example, the likelihoods associated with each web page in a cluster may be aggregated to indicate an overall relevancy score for a cluster. As shown in FIG. 3, cluster relevancy evaluator 308 generates cluster ranking 324, which indicates a ranked listing of the clusters of cluster list 322. Note that cluster ranking 324 may be filtered by cluster relevancy evaluator 308, such that not all clusters of cluster list 322 are included in cluster ranking 324.

At step 408 in flowchart 400, a cluster of the clusters having a greatest ranking is identified. For example, and with continued reference to FIG. 3, cluster selector 310 may receive cluster ranking 324 as a ranking of clusters from cluster relevancy evaluator 308 and identify a cluster from the ranked clusters that have the highest relevancy to the user. In addition, cluster selector 310 may receive in cluster ranking 324 information related to the clusters, their corresponding relevancy scores, and may identify clusters above a predetermined threshold.

At step 410 in flowchart 400, an indication is provided to the user of a web page of the identified cluster as a suggested web page to revisit. For example, and with continued reference to FIG. 3, cluster selector 310 generates and provides selected cluster information 326 that includes indications of one or more web pages from one or more identified clusters. For example, the indication may include a title, a URL, and/or a thumbnail of the one or more web pages of each identified cluster in selected cluster information 326.

Figure 5:
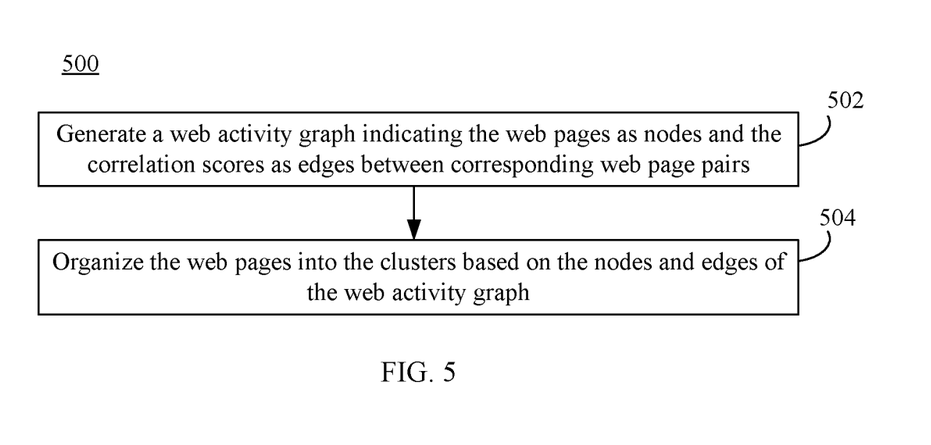
FIG. 5 shows a flowchart of a method for generating a web activity graph representing correlations between web pages of a browser web history, according to an example embodiment, according to an example embodiment.

To help further illustrate the foregoing, FIG. 5 is described. FIG. 5 depicts a flowchart 500 of a method for generating a web activity graph representing correlations between web pages of a browser web history, according to an example embodiment. FIG. 5 will be described with continued reference to FIG. 3. However, other structural and operational embodiments will be apparent to persons skilled in the relevant art(s) based on the following discussion regarding flowchart 500.

As shown in FIG. 5, the method of flowchart 500 begins at step 502. In step 502, a web activity graph is generated, where the web activity graph indicates the web pages as nodes and the correlation scores as edges between corresponding web page pairs. For example, and with continued reference to FIG. 3, cluster generator 306 may generate web activity graph 316 based on correlation scores 328, representing the correlations between web pages of web browsing history 314. In one implementation of web activity graph 316, web pages may be indicated as nodes and correlation scores may be indicated as edges between corresponding web page pairs.

At step 504 in flowchart 500, the web pages are organized into the clusters based on the nodes and edges of the web activity graph. For example, and with continued reference to FIG. 3, cluster generator 306 organizes web pages into clusters based on the nodes and edges of the web activity graph 316. For instance, the closer the nodes of web pages are to each other (i.e., shorter edges between the nodes) the stronger the correlation there is between the web pages (i.e., the greater the correlation score). Thus, nodes of web pages closer together are more likely to be organized into clusters than web pages with more distantly separated nodes. Web page pairs with lower correlation scores are indicated as having a correspondingly greater distance between their nodes in web activity graph 316.

Figure 6:
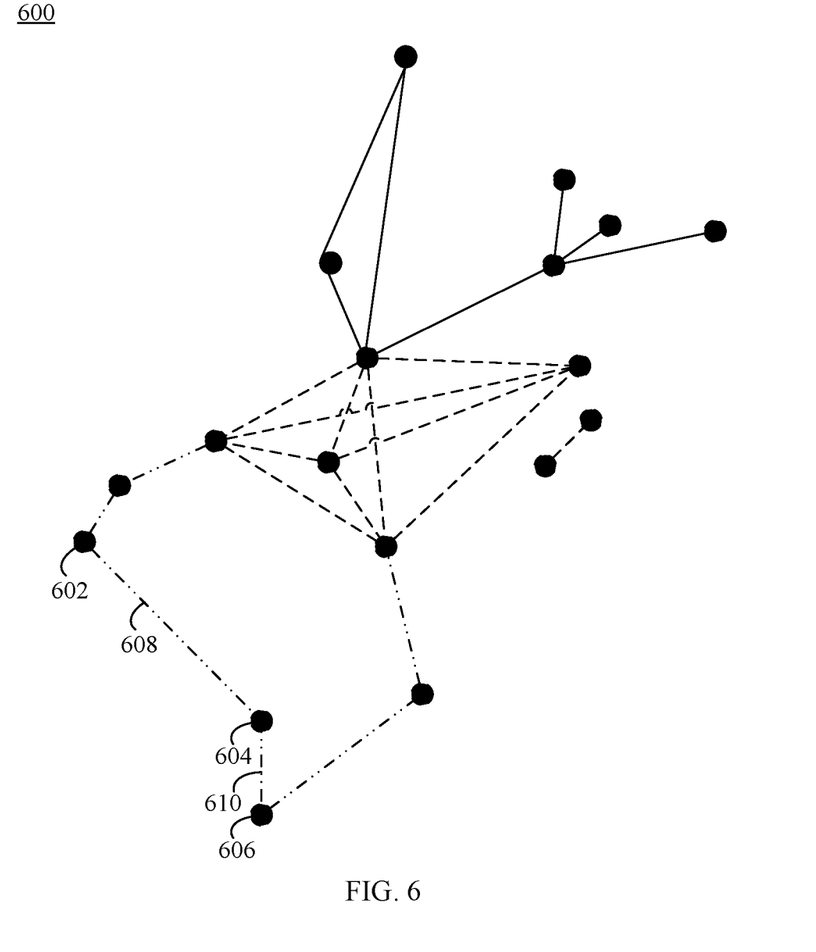
FIG. 6 shows an example embodiment of a web activity graph, according to an example embodiment.

FIG. 6 is an example graphical representation of a web activity graph 600 for a corresponding example set of web pages for which correlation scores 320 may be generated. Web activity graph 600 is an example embodiment of web activity graph 316 in FIG. 3. In web activity graph 600, the web pages are represented as nodes, the correlation scores as edges between corresponding web page pairs, and the clusters of web pages as the different line types. In FIG. 6, the closer the nodes of web pages are to each other (i.e., shorter edges between the nodes) the stronger the correlation is between the web pages. For example, a node 604 is closer to a node 606 than to a node 602 and an edge 608 is longer than an edge 610. Thus, node 604 has a stronger correlation with node 606 than node 602.

Nodes with no edge between them may have substantially no correlation between them (e.g., zero correlation, or a correlation value below a predetermined minimum threshold). However, based on how the correlation scores are calculated, web activity graph 600 may indicate the correlation between two web pages based only on web navigational activities or based only on content similarity.

Figure 7:
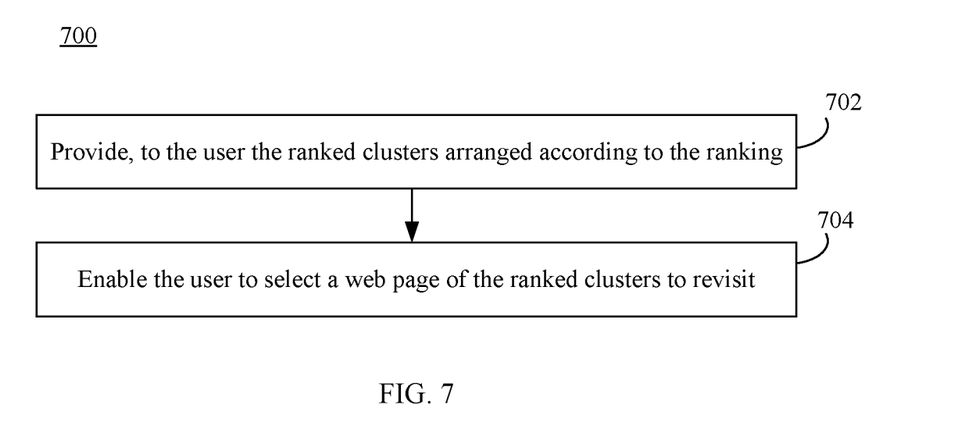
FIG. 7 shows a flowchart of a method for enabling a user to select a web page of ranked clusters to revisit, according to an example embodiment.

FIG. 7 will now be described. FIG. 7 depicts a flowchart 700 of a method for enabling a user to select a web page of ranked clusters to revisit, according to an example embodiment. FIG. 7 will be described with continued reference to FIG. 3. However, other structural and operational embodiments will be apparent to persons skilled in the relevant art(s) based on the following discussion regarding flowchart 700.

As shown in FIG. 7, the method of flowchart 700 begins at step 702. In step 702, the ranked clusters, arranged according to the ranking, are provided to the user. For example, and with continued reference to FIG. 3, cluster selector 310 may receive ranked clusters from cluster relevancy evaluator 308 and select to provide all or a portion of the ranked clusters to a user in selected cluster information 326. Selected cluster information 326 may be presented to the user in a user interface, such by being displayed in a graphical user interface (GUI) (e.g., as indication 210 displayed in display window 206 in FIG. 2) or in any other manner.

At step 704 in flowchart 700, the user is enabled to select a web page of the ranked clusters to revisit. For example, and with continued reference to FIG. 3, cluster selector 310 generates selected cluster information 326 to provide to the user. Selected cluster information 326 may include indications of one or more web pages from each of the one or more ranked clusters. For example, selected cluster information 326 may include a title and a thumbnail of a web page from the one or more web pages that if a user clicks may enable to user to traverse to the web page.

Figure 8:
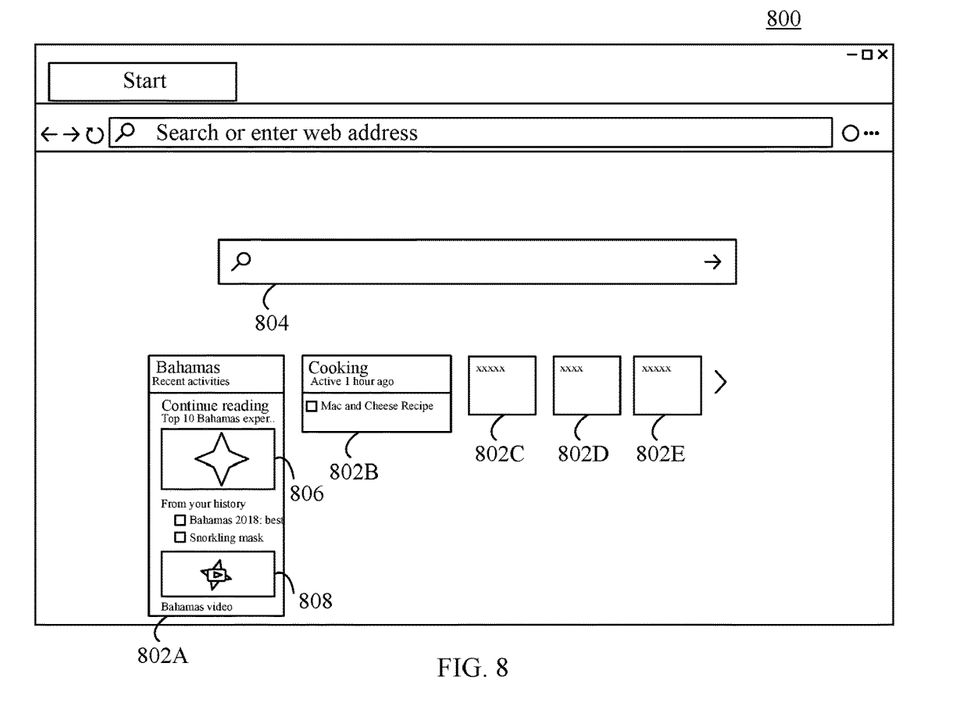
FIG. 8 shows an example embodiment of a web browser providing indications of web pages from identified clusters, according to an example embodiment, according to an example embodiment.
Figure 9:
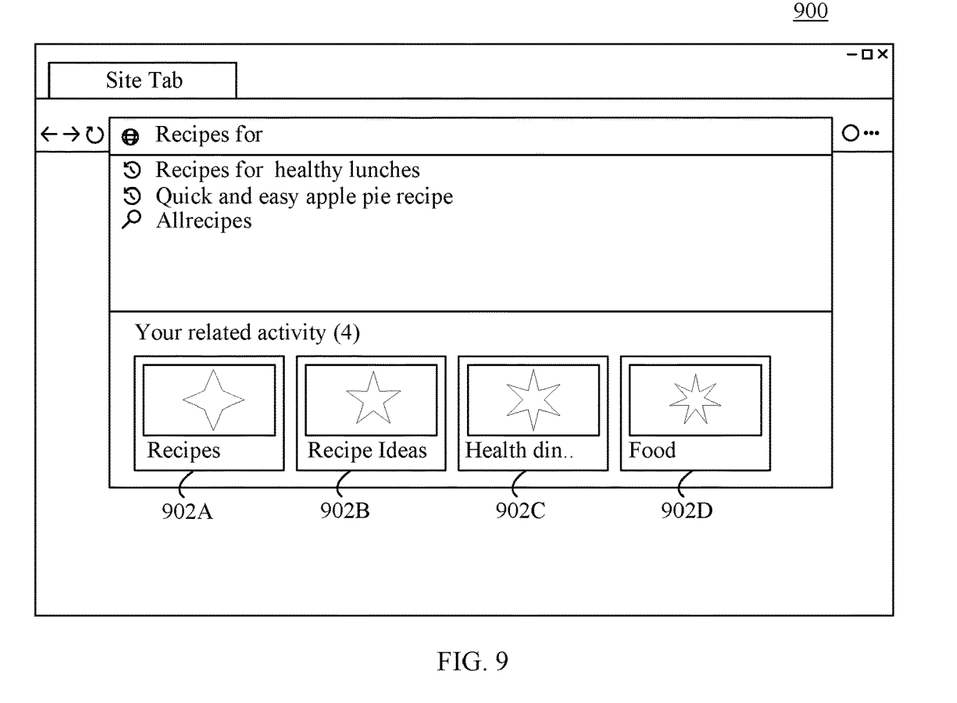
FIG. 9 shows another example embodiment of a web browser providing indications of web pages from identified clusters, according to an example embodiment.

FIGS. 8 and 9 provide example embodiments of how web pages of an identified cluster may be presented to a user in a web browser. As shown in FIG. 8, web browser 800 presents a page that indicates a plurality of clusters 802A-802E. FIG. 8 shows only clusters 802A-802E but any number of indications of a cluster may be displayed to a user. As portrayed in FIG. 8, a user may traverse the provided clusters by clicking on an arrow button next to cluster 802E and search clusters using a search bar 804.

In FIG. 8, clusters 802A-802E are identified topically. For example, cluster 802A is titled "Bahamas" and cluster 802B is titled "Cooking". Cluster 802A provides several titles of web pages and thumb nails 806 and 808 of web pages related to the Bahamas. The user may have previously visited these web pages while researching a trip to the Bahamas. The user may click the titles or thumb nails 806 and 808 provided in cluster 802A to access these web pages that she previously has visited.

FIG. 9 provides an example of displaying indications of clusters in a browser based on a user's internet search. As depicted in FIG. 9, a user inputted "recipes for" into a search bar of a web browser 900. In addition to providing recommendations to complete the statement of "recipes for", web browser 900 recommends clusters 902A-902D related to the user's search to the user.

In other embodiments, selected cluster information 326 may be presented to a user in any other manner, as would be apparent to persons skilled in the relevant art(s) from the teachings provided herein.

III. Example Computer System Implementation

Cloud computing environment 102, web page recommendation engine 104, web page recommendation engine 204, web page recommendation engine 302, flowchart 400, flowchart 500, and/or flowchart 700 may be implemented in hardware, or hardware combined with one or both of software and/or firmware. For example, cloud computing environment 102, web page recommendation engine 104, web page recommendation engine 204, web page recommendation engine 302, flowchart 400, flowchart 500, and/or flowchart 700 may be implemented as computer program code/instructions configured to be executed in one or more processors and stored in a computer readable storage medium. In another embodiment, cloud computing environment 102, web page recommendation engine 104, web page recommendation engine 204, web page recommendation engine 302, flowchart 400, flowchart 500, and/or flowchart 700 may also be implemented in hardware that operates software as a service (SaaS) or platform as a service (PaaS). Alternatively, cloud computing environment 102, web page recommendation engine 104, web page recommendation engine 204, web page recommendation engine 302, flowchart 400, flowchart 500, and/or flowchart 700 may be implemented as hardware logic/electrical circuitry.

For instance, in an embodiment, one or more, in any combination, of cloud computing environment 102, web page recommendation engine 104, web page recommendation engine 204, web page recommendation engine 302, flowchart 400, flowchart 500, and/or flowchart 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
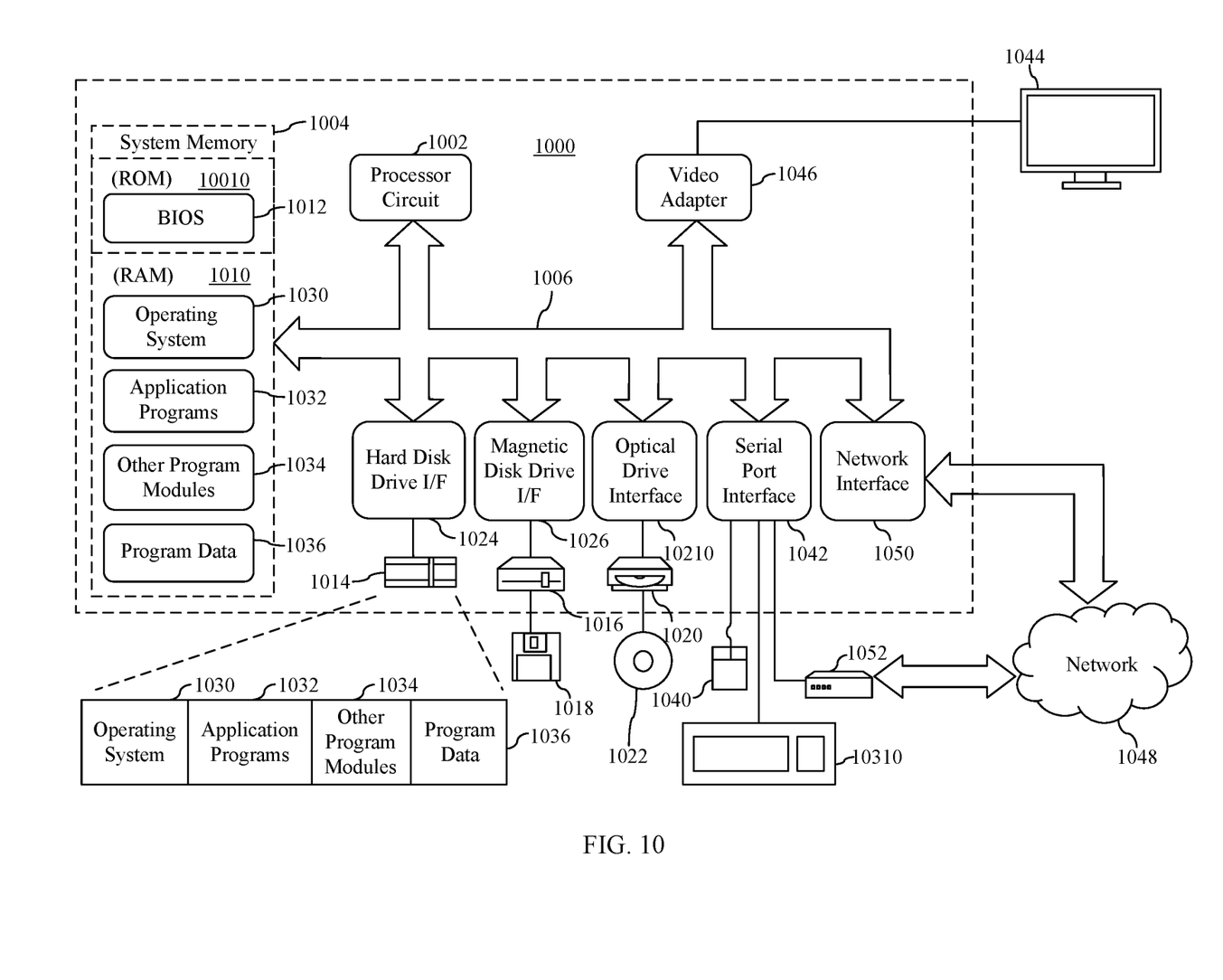
FIG. 10 is a block diagram of an example processor-based computer system that may be used to implement various embodiments.

FIG. 10 depicts an exemplary implementation of a computing device 1000 in which embodiments may be implemented. For example, components of Cloud computing environment 102, web page recommendation engine 104, smart phone 108, laptop 110, desktop 112, and tablet 114, computing device 202, web page recommendation engine 204, and/or web page recommendation engine 302 may each be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 10110, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing web page recommendation engine 104, web page recommendation engine 204, web page recommendation engine 302, flowchart 400, flowchart 500, and/or flowchart 700 (including any suitable step of flowcharts 500, 600, and 700), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers. Display screen 1044, and/or any other peripheral output devices (not shown) may be used for implementing web browser 208, web browser 800 and web browser 900, and/or any further embodiments described herein.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In a first embodiment, a computing device, comprises: one or more processors; and one or more memory devices that store computer program logic for execution by the one or more processors, the computer program logic comprising: a correlation score determiner configured to calculate correlation scores that indicate correlations between web pages indicated in a browsing history of a user, the correlation score determiner configured to calculate the correlation scores based on web navigational activities determined from the browsing history; a cluster generator configured to cluster the web pages into a plurality of clusters based on the correlation scores; a cluster relevancy evaluator configured to rank the clusters for relevancy to the user based on a relevancy algorithm, the relevancy algorithm configured to determine a plurality of likelihoods, each likelihood of the likelihoods being a likelihood of the user accessing a corresponding web page of the web pages; and a cluster selector configured to identify a cluster of the clusters having a greatest ranking, and provide, to the user, an indication of a web page of the identified cluster as a suggested web page to revisit.

In an embodiment of the foregoing computing device, the correlation score determiner is configured to collect the web navigational activities while the user browses the Internet using a browser of the computing device, the web navigational activities including at least one of: an amount of time the user spends at a web page; a navigational trait of how a web page is visited; or at least one of temporal information or navigational information that associate a first web page with a second web page of the web pages.

In an embodiment of the foregoing computing device, the correlation score determiner is configured to collect the web navigational activities from a plurality of computing devices used by the user.

In an embodiment of the foregoing computing device, the cluster generator is configured to: generate a web activity graph indicating the web pages as nodes and the correlation scores as edges between corresponding web page pairs; and organize the web pages into the clusters based on the nodes and edges of the web activity graph.

In an embodiment of the foregoing computing device, the cluster relevancy evaluator is configured to filter the clusters based on a context of usage of the computing device by the user.

In an embodiment of the foregoing computing device, the cluster relevancy evaluator is further configured to calculate a relevancy score for each of the clusters based on the determined likelihoods.

In an embodiment of the foregoing computing device, the cluster selector is configured to provide, to the user the ranked clusters arranged according to the ranking, and to enable the user to select a web page of the ranked clusters to revisit.

In another embodiment, a method, comprises: calculating correlation scores that indicate correlations between web pages indicated in a browsing history of a user, wherein the correlation scores are calculated based on web navigational activities determined from the browsing history; clustering the web pages into a plurality of clusters based on the correlation scores; ranking the clusters for relevancy to the user based on a relevancy algorithm, the relevancy algorithm configured to determine a plurality of likelihoods, each likelihood of the likelihoods being a likelihood of the user accessing a corresponding web page of the web pages; identifying a cluster of the clusters having a greatest ranking; and providing, to the user, an indication of a web page of the identified cluster as a suggested web page to revisit.

In an embodiment of the foregoing method, the method further comprising: collecting the web navigational activities while the user browses the Internet using a browser of the computing device, the web navigational activities including at least one of: an amount of time the user spends at a web page; a navigational trait of how a web page is visited; or at least one of temporal information or navigational information that associate a first web page with a second web page of the web pages.

In an embodiment of the foregoing method, the method further comprises: collecting the web navigational activities from a plurality of computing devices used by the user.

In an embodiment of the foregoing method, the method further comprises: generating a web activity graph indicating the web pages as nodes and the correlation scores as edges between corresponding web page pairs; and organizing the web pages into the clusters based on the nodes and edges of the web activity graph.

In an embodiment of the foregoing method, the method further comprises: filtering the clusters based on a context of usage of the computing device by the user.

In an embodiment of the foregoing method, the method further comprises: calculating a relevancy score for each of the clusters based on the determined likelihoods.

In an embodiment of the foregoing method, the method further comprises: providing, to the user the ranked clusters arranged according to the ranking; and enabling the user to select a web page of the ranked clusters to revisit.

In another embodiment, a computer-readable storage medium having program instructions recorded thereon that, when executed by at least one processor of a client computing device, causes the at least one processor to perform a method comprises: calculating correlation scores that indicate correlations between web pages indicated in a browsing history of a user, wherein the correlation scores are calculated based on web navigational activities determined from the browsing history; clustering the web pages into a plurality of clusters based on the correlation scores; ranking the clusters for relevancy to the user based on a relevancy algorithm, the relevancy algorithm configured to determine a plurality of likelihoods, each likelihood of the likelihoods being a likelihood of the user accessing a corresponding web page of the web pages; identifying a cluster of the clusters having a greatest ranking; and providing, to the user, an indication of a web page of the identified cluster as a suggested web page to revisit.

In an embodiment of the foregoing computer-readable storage medium, the method further comprises: collecting the web navigational activities while the user browses the Internet using a browser of the computing device, the web navigational activities including at least one of: an amount of time the user spends at a web page; a navigational trait of how a web page is visited; or at least one of temporal information or navigational information that associate a first web page with a second web page of the web pages.

In an embodiment of the foregoing computer-readable storage medium, the method further comprises: collecting the web navigational activities from a plurality of computing devices used by the user.

In an embodiment of the foregoing computer-readable storage medium, the method further comprises: generating a web activity graph indicating the web pages as nodes and the correlation scores as edges between corresponding web page pairs; and organizing the web pages into the clusters based on the nodes and edges of the web activity graph.

In an embodiment of the foregoing computer-readable storage medium, the method further comprises: filtering the clusters based on a context of usage of the computing device by the user.

In an embodiment of the foregoing computer-readable storage medium, the method further comprises: calculating a relevancy score for each of the clusters based on the determined likelihoods.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
one or more processors; and
one or more memory devices that store executable computer program logic for execution by the one or more processors, the executable computer program logic comprising:
a correlation score determiner configured to calculate correlation scores that indicate correlations between web pages indicated in a browsing history of a user, the correlation score determiner configured to calculate correlation scores for pairs of web pages in the browsing history, each correlation score of the correlation scores calculated based on a combination of coefficients corresponding to types of web navigational activities;
a cluster generator configured to cluster the web pages into a plurality of clusters based on the correlation scores;
a cluster relevancy evaluator configured to rank the clusters for relevancy to the user based on a relevancy algorithm, the relevancy algorithm configured to determine a plurality of likelihoods, each likelihood of the likelihoods being a likelihood of the user accessing a corresponding web page of the web pages; and
a cluster selector configured to
identify a cluster of the clusters having a greatest ranking, and
provide, to the user, an indication of a web page of the identified cluster as a suggested web page to revisit.

2. The computing device of claim 1, wherein the correlation score determiner is configured to collect the web navigational activities while the user browses the Internet using a browser of the computing device, the web navigational activities including at least one of:
an amount of time the user spends at a web page;
a navigational trait of how a web page is visited; or
at least one of temporal information or navigational information that associate a first web page with a second web page of the web pages.

3. The computing device of claim 1, wherein the correlation score determiner is configured to collect the web navigational activities from a plurality of computing devices used by the user.

4. The computing device of claim 1, wherein the cluster generator is configured to:
generate a web activity graph indicating the web pages as nodes and the correlation scores as edges between corresponding web page pairs; and
organize the web pages into the clusters based on the nodes and edges of the web activity graph.

5. The computing device of claim 1, wherein the cluster relevancy evaluator is configured to filter the clusters based on a context of usage of the computing device by the user.

6. The computing device of claim 1, wherein:
the cluster relevancy evaluator is further configured to calculate a relevancy score for each of the clusters based on the determined likelihoods.

7. The computing device of claim 1, wherein the cluster selector is configured to provide, to the user the ranked clusters arranged according to the ranking, and to enable the user to select a web page of the ranked clusters to revisit.

8. A method, comprising:
calculating correlation scores that indicate correlations between web pages indicated in a browsing history of a user, wherein said calculating comprises calculating correlation scores for pairs of web pages in the browsing history, each correlation score of the correlation scores calculated based on a combination of coefficients corresponding to types of web navigational activities;
clustering the web pages into a plurality of clusters based on the correlation scores;
ranking the clusters for relevancy to the user based on a relevancy algorithm, the relevancy algorithm configured to determine a plurality of likelihoods, each likelihood of the likelihoods being a likelihood of the user accessing a corresponding web page of the web pages;
identifying a cluster of the clusters having a greatest ranking; and
providing, to the user, an indication of a web page of the identified cluster as a suggested web page to revisit.

9. The method of claim 8, further comprising:
collecting the web navigational activities while the user browses the Internet using a browser of the computing device, the web navigational activities including at least one of:
an amount of time the user spends at a web page;
a navigational trait of how a web page is visited; or
at least one of temporal information or navigational information that associate a first web page with a second web page of the web pages.

10. The method of claim 8, further comprising:
collecting the web navigational activities from a plurality of computing devices used by the user.

11. The method of claim 8, further comprising:
generating a web activity graph indicating the web pages as nodes and the correlation scores as edges between corresponding web page pairs; and
organizing the web pages into the clusters based on the nodes and edges of the web activity graph.

12. The method of claim 8, further comprising:
filtering the clusters based on a context of usage of the computing device by the user.

13. The method of claim 8, further comprising:
calculating a relevancy score for each of the clusters based on the determined likelihoods.

14. The method of claim 8, further comprising:
providing, to the user the ranked clusters arranged according to the ranking; and
enabling the user to select a web page of the ranked clusters to revisit.

15. A computer-readable storage medium having program instructions recorded thereon that, when executed by at least one processor of a client computing device, causes the at least one processor to perform a method comprising:
calculating correlation scores that indicate correlations between web pages indicated in a browsing history of a user, wherein said calculating comprises calculating correlation scores for pairs of web pages in the browsing history, each correlation score of the correlation scores calculated based on a combination of coefficients corresponding to types of web navigational activities;
clustering the web pages into a plurality of clusters based on the correlation scores;
ranking the clusters for relevancy to the user based on a relevancy algorithm, the relevancy algorithm configured to determine a plurality of likelihoods, each likelihood of the likelihoods being a likelihood of the user accessing a corresponding web page of the web pages;
identifying a cluster of the clusters having a greatest ranking; and
providing, to the user, an indication of a web page of the identified cluster as a suggested web page to revisit.

16. The computer-readable storage medium of claim 15, wherein the method further comprises:
collecting the web navigational activities while the user browses the Internet using a browser of the computing device, the web navigational activities including at least one of:
an amount of time the user spends at a web page;
a navigational trait of how a web page is visited; or
at least one of temporal information or navigational information that associate a first web page with a second web page of the web pages.

17. The computer-readable storage medium of claim 15, wherein the method further comprises:
collecting the web navigational activities from a plurality of computing devices used by the user.

18. The computer-readable storage medium of claim 15, wherein the method further comprises:
generating a web activity graph indicating the web pages as nodes and the correlation scores as edges between corresponding web page pairs; and
organizing the web pages into the clusters based on the nodes and edges of the web activity graph.

19. The computer-readable storage medium of claim 15, wherein the method further comprises:
filtering the clusters based on a context of usage of the computing device by the user.

20. The computer-readable storage medium of claim 15, wherein the method further comprises:
 calculating a relevancy score for each of the clusters based on the determined likelihoods.

\* \* \* \* \*